United States Patent
Kington et al.

(10) Patent No.: US 9,447,484 B2
(45) Date of Patent: Sep. 20, 2016

(54) METHODS FOR FORMING OXIDE DISPERSION-STRENGTHENED ALLOYS

(71) Applicant: HONEYWELL INTERNATIONAL INC., Morristown, NJ (US)

(72) Inventors: Harry Lester Kington, Scottsdale, AZ (US); Donald G. Godfrey, Phoenix, AZ (US); Mark C. Morris, Phoenix, AZ (US); Michael G. Volas, Gilbert, AZ (US); Brian Hann, Avondale, AZ (US); Robert J. Dawson, Gilbert, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 333 days.

(21) Appl. No.: 14/043,994

(22) Filed: Oct. 2, 2013

(65) Prior Publication Data

US 2015/0093279 A1   Apr. 2, 2015

(51) Int. Cl.
| | |
|---|---|
| B22F 3/105 | (2006.01) |
| B22F 5/00 | (2006.01) |
| B22F 5/04 | (2006.01) |
| C22C 1/04 | (2006.01) |
| C22C 1/10 | (2006.01) |
| C22C 32/00 | (2006.01) |
| B22F 9/08 | (2006.01) |

(52) U.S. Cl.
CPC ............ *C22C 1/0491* (2013.01); *B22F 3/1055* (2013.01); *C22C 1/10* (2013.01); *C22C 32/0026* (2013.01); *B22F 5/04* (2013.01); *B22F 9/082* (2013.01); *Y02P 10/295* (2015.11)

(58) Field of Classification Search
CPC ........ B22F 3/1055; B22F 5/009; B22F 5/04; B22F 2302/25; B22F 2302/253; B22F 2302/256; C22C 1/0416; C22C 1/0491; C22C 1/10; B33Y 10/00
USPC ......................................... 419/19, 25, 53, 55
See application file for complete search history.

(56) References Cited

U.S. PATENT DOCUMENTS

| | | | |
|---|---|---|---|
| 4,832,982 A | 5/1989 | Mori et al. | |
| 4,968,348 A | 11/1990 | Abkowitz et al. | |

(Continued)

FOREIGN PATENT DOCUMENTS

| | | |
|---|---|---|
| CN | 103008657 A | 4/2013 |
| CN | 103060591 A | 4/2013 |

(Continued)

OTHER PUBLICATIONS

English translation of DE 10 2007 018123; Oct. 2008; 17 pages.*

(Continued)

*Primary Examiner* — Helene Klemanski
(74) *Attorney, Agent, or Firm* — Lorenz & Kopf, LLP

(57) ABSTRACT

In accordance with an exemplary embodiment, a method of forming a oxide dispersion-strengthened alloy metal includes the steps of providing, in a powdered form, an oxide dispersion-strengthened alloy composition that is capable of achieving a dispersion-strengthened microstructure, directing a low energy density energy beam at a portion of the alloy composition, withdrawing the energy beam from the portion of the powdered alloy composition, and cooling the portion of the powdered alloy composition at a rate greater than or equal to about $10^{6°}$ F. per second, thereby forming the oxide dispersion-strengthened alloy metal.

18 Claims, 2 Drawing Sheets

(56) References Cited

U.S. PATENT DOCUMENTS

| | | | |
|---|---|---|---|
| 5,449,536 A | 9/1995 | Funkhouser et al. | |
| 5,640,667 A | 6/1997 | Freitag et al. | |
| 6,024,792 A | 2/2000 | Kurz et al. | |
| 6,048,954 A | 4/2000 | Barlow et al. | |
| 6,269,540 B1 | 8/2001 | Islam et al. | |
| 6,402,476 B1 | 6/2002 | Bossmann et al. | |
| 7,311,873 B2 | 12/2007 | Moxson et al. | |
| 7,521,017 B2 | 4/2009 | Kunze et al. | |
| 7,540,996 B2 | 6/2009 | Bampton | |
| 8,728,388 B2 * | 5/2014 | Morris | B22F 3/1055 419/26 |
| 9,175,568 B2 * | 11/2015 | Ryan | B22F 3/1055 |
| 2004/0133298 A1 | 7/2004 | Toyserkani et al. | |
| 2009/0041609 A1 | 2/2009 | Duz et al. | |
| 2010/0040500 A1 | 2/2010 | Wang et al. | |
| 2010/0074788 A1 | 3/2010 | Moxson et al. | |
| 2011/0106290 A1 | 5/2011 | Hovel et al. | |
| 2012/0000072 A9 | 1/2012 | Morrison et al. | |
| 2013/0280547 A1 | 10/2013 | Brandl et al. | |
| 2014/0271322 A1 * | 9/2014 | Godfrey | B22F 3/1055 419/25 |
| 2015/0024233 A1 * | 1/2015 | Gunther | B22F 3/1055 419/53 |
| 2015/0093279 A1 * | 4/2015 | Kington | B22F 3/1055 419/19 |
| 2015/0298212 A1 * | 10/2015 | Hann | B22F 5/009 419/12 |

FOREIGN PATENT DOCUMENTS

| | | |
|---|---|---|
| DE | 10 2007 018123 | * 10/2008 |
| EP | 2586887 A1 | 5/2013 |

OTHER PUBLICATIONS

Derwent Abstract of CN 103060591; Apr. 2013.*

English translation of CN 103060591; Apr. 2013; 6 pages.*

Derwent Abstract of CN 103008657; Apr. 2013.*

English translation of CN 103008657; Apr. 2013; 4 pages.*

Wang et al.; "Optimization of the LENS process for steady molten pool size"; Materials Science and Engineering A 474; pp. 148-156; 2008. no month available.*

Metal Additive Manufacturing; Lawrence Livermore National Laboratory; https://manufacturing.llnl.gov/additive-manufacturing/metal-additive-manufacturing; no date available; 6 pages.*

Megahed et al.; "Metal additive-manufacturing process and residual stress modeling"; Integrating Materials and Manufacturing Innovation, a SpringerOpen Journal; 2016; no month available; 33 pages.*

Extended EP search report for EP 15162296.6-1353 dated Sep. 15, 2015.

Kurz, W., et al.; Rapid solidification processing and microstructure formation; Materials Science and Engineering A: Structural Materials: Properties, Microstructures and Processing; vol. 179-180, May 1, 1994.

Extended EP search report for EP 14184849.9-1353/2857125 dated Jul. 15, 2003.

Bush, R.W., et al.; Elevated temperature characterization of electron beam freeform fabricated Ti—6Al—4V and dispersion strengthened Ti—8Al—1Er; Materials Science and Engineering A 554 (2012) 12-21.

Walker, J., et al.; Fabrication of Fe—Cr—Al Oxide Dispersion Strengthened PM2000 alloy using Selective Laser Melting; University of Liverpool, Department of Engineering, Brownlow Hill, Liverpool, L69 3GH, UK.

USPTO Notice of Allowance for U.S. Appl. No. 14/254,352 dated Apr. 13, 2016.

USPTO Office Action, Notification Date Dec. 15, 2015; U.S. Appl. No. 14/254,352.

* cited by examiner

METHODS FOR FORMING OXIDE DISPERSION-STRENGTHENED ALLOYS

TECHNICAL FIELD

Embodiments of the present disclosure generally relate to metal alloys for use in aerospace applications, and more particularly relate to improved methods for forming oxide dispersion-strengthened (ODS) alloys.

BACKGROUND

Turbine engines are used as the primary power source for various kinds of aircraft and other vehicles. The engines may also serve as auxiliary power sources that drive air compressors, hydraulic pumps, and industrial electrical power generators. Most turbine engines generally follow the same basic power generation procedure. Compressed air is mixed with fuel and burned, and the expanding hot combustion gases are directed against stationary turbine vanes in the engine. The vanes turn the high velocity gas flow partially sideways to impinge onto turbine blades mounted on a rotatable turbine disk. The force of the impinging gas causes the turbine disk to spin at high speed. Jet propulsion engines use the power created by the rotating turbine disk to draw more air into the engine, and the high velocity combustion gas is passed out of the gas turbine aft end to create forward thrust. Other engines use this power to turn one or more propellers, electrical generators, or other devices. Because fuel efficiency increases as engine operating temperatures increase, turbine engine blades and vanes are typically fabricated from high-temperature materials, such a high-temperature metal alloys.

Conventional high-temperature alloys are strengthened mainly by solid solution and precipitation mechanisms that hinder dislocation movement. As the desired service temperatures become increasingly higher and the service life becomes significantly longer, these alloys can eventually lose their strength as the precipitates become dissolved or coarsened, and the solid solute atoms become highly diffusive due to the greatly increased thermal agitation. Oxide dispersion strengthened (ODS) alloys, on the other hand, derive their high temperature strength mainly from a fine dispersion of oxides that are nearly insoluble in the matrix. This insolubility enables the oxide particles to hinder dislocation movements and thus retain strength up to temperatures near the matrix melting point. Furthermore, unlike precipitation strengthening, which requires high solubility of solute atoms at high temperatures and vice versa, the ODS mechanism is free from this temperature solubility requirement. ODS alloys are not produced by traditional melt metallurgy liquid metal exposures since the ODS particles will dissolve in a liquid metal state.

Such ODS alloys are currently produced by the mechanical alloying process, as illustrated in FIG. 1. Powders of oxide, elemental metals, and alloys are mixed in a high-energy ball mill to form composite powders with the dispersoid. Ingots are then obtained by hot extrusion. Alloys produced in this fashion, i.e. ODS alloys, have typically been used to produce directional property structures such as turbine blades and sheet materials for static structures. Unfortunately, it is very difficult to ball mill a highly alloyed material, containing a significant gamma prime volume fraction which is strong. Further, the material may itself become contaminated from the ball mill and ultimately compromise component integrity. In addition, the powder that is produced requires subsequent hot compaction or working to produce an acceptable microstructure and consistent mechanical properties.

Accordingly, it is desirable to provide improved methods for forming oxide dispersion-strengthened alloys. Further, it is desirable to provide such methods that do not require mechanical alloying. Furthermore, other desirable features and characteristics of the invention will become apparent from the subsequent detailed description and the appended claims, taken in conjunction with the accompanying drawings and this background of the invention.

BRIEF SUMMARY

In accordance with an exemplary embodiment, a method of forming a oxide dispersion-strengthened alloy metal includes the steps of providing, in a powdered form, an oxide dispersion-strengthened alloy composition that is capable of achieving a dispersion-strengthened microstructure, directing a low energy density energy beam at a portion of the alloy composition, withdrawing the energy beam from the portion of the powdered alloy composition, and cooling the portion of the powdered alloy composition at a rate greater than or equal to about 106° F. per second, thereby forming the oxide dispersion-strengthened alloy metal.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
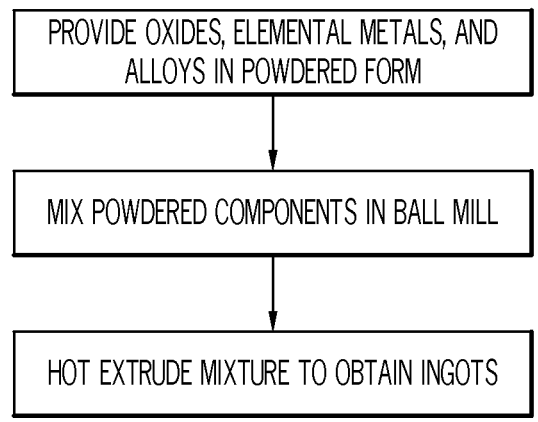
FIG. 1 is a flow diagram illustrating the steps in a prior art process for forming components with oxide dispersion-strengthened alloys.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments and implementations of the alloys and methods for the manufacture thereof described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Further, although certain embodiments described herein provide improved methods for forming oxide dispersion-strengthened alloy components for use in aerospace applications, more particularly for use as gas turbine engine components, it will be appreciated that the methods described herein will be useful in any number of applications wherein components formed of such alloys would be useful. In particular, the methods described herein may find application in any of various implementations where it is desirable to employ light-weight alloys for high-temperature applications.

Disclosed herein is an improved method for forming oxide dispersion-strengthened alloy components using a free-form manufacturing process. Embodiments of the present disclosure utilize a manufacturing process that incorporates a low energy density laser beam, referred to as "direct metal laser fusion" (DMLF), or a low energy electron beam, referred to as "electron beam melting" (EBM) (together referred to herein as "low energy density energy beams"), in a powder tank. These "free-form" or "additive manufacturing" (AM) processes use a small, focused beam to build a component by fusing or melting one layer of powder to the fused or melted layer of powder directly beneath it. The additive manufacturing methods disclosed herein utilize DMLF/EBM to build unique designs that are not practical and/or possible with prior technologies such as mechanical alloying, where costly and time-consuming tooling and processes are required.

In general, it is expected that, based on the teachings herein, a person having ordinary skill in the art will be able to design a component part, such as for use in a gas turbine engine, to conform for use in a wide variety of applications, as the selection of size, shape, etc. of working components is generally considered to be within the level of skill of a person having ordinary skill in the art. As such, the various possible implementations and uses of the improved methods described herein should not be considered limited to any of the embodiments presented herein.

As generally appreciated in the art, ODS alloys are alloys strengthened through the inclusion of a fine dispersion of oxide particles. Oxide dispersion strengthened alloys typically consist of a high temperature metal matrix—such as iron aluminide, iron chromium, iron-chromium-aluminum, nickel chromium or nickel aluminide—with small (for example, from about 5 nm to about 50 nm) oxide particles of, for example, yttria (Y2O3) dispersed within it. In accordance with various embodiments of the present disclosure, ODS alloys may include nickel chromium ODS alloys. Nickel chromium ODS alloys may contain about 10-40% chromium (Cr), about 0.2-5% aluminum (Al), about 0.3-5% titanium (Ti), about 0-5% tungsten (W), about 0-2% molybdenum (Mo), about 0-2% tantalum (Ta), and about 0.3-2.5% oxide dispersoid, such as yttria, hafnia, silica, zirconia, thoria, or magnesia, with the balance being nickel, where alloy percentages are given by weight. For example, ODS alloys such as MA754 contain 20% chromium (Cr), 0.3% aluminum (Al), 0.5% titanium (Ti), 0.6% yttria ($Y_2O_3$), with the balance being nickel (Ni). In another example, thoria-dispersion strengthened nickel and nickel chromium alloys include about 1.5% to about 2.5% thoria ($ThO_2$), such as about 2%, thoria ($ThO_2$), with about 15% to about 25% Cr, such as about 20% Cr (for the nickel chromium alloy), with the balance being nickel. Nickel aluminide and iron aluminide ODS alloy systems may contain 10-30 wt % of Al and about 0.3-2.5% oxide dispersoid, with the balance being Ni or Fe, respectively. Iron chromium ODS alloy systems may contain about 10-30 wt % Cr and about 0.3-2.5% oxide dispersoid, with the balance Fe. Iron chromium aluminide ODS alloy systems may contain about 8-25 wt % Cr and about 3-8 wt % Al and about 0.3-2.5% oxide dispersoid, with the balance being Fe. Iron-based and nickel-based oxide dispersion strengthened alloys exhibit good corrosion resistance and mechanical properties at elevated temperatures. These alloys also show excellent creep resistance, which stems partly from the dispersion of oxide and other particles, and partly from the very large elongated grain structure.

Prior to manufacturing using the free-form manufacturing processes of the present disclosure, the alloy may be provided in powdered form by, for example, mixing a plurality of metals and oxides forming the alloy to form a mixture, melting the mixture to form a melted mixture, and atomizing the melted mixture into the powdered form. Alternatively, the powdered form of the alloy may be provided by hydrometallurgical processes. As will be appreciated by those having ordinary skill in the art, hydrometallurgy refers to methods for obtaining metals from their ores. In particular, hydrometallurgy is a technique within the field of extractive metallurgy involving the use of aqueous chemistry for the recovery of metals from ores, concentrates, and recycled or residual materials. Hydrometallurgy is typically divided into three general areas: leaching, solution concentration and purification, and metal recovery. Leaching involves the use of aqueous solutions containing a lixiviant which is brought into contact with a material containing a valuable metal. After leaching, the leach liquor must normally undergo concentration of the metal ions that are to be recovered. Additionally, undesirable metal ions sometimes require removal. Metal recovery is the final step in a hydrometallurgical process. The primary types of metal recovery processes are electrolysis, gaseous reduction, and precipitation. Generally speaking, any known form of producing an alloy powder will be appreciated to be within the scope of the present disclosure, for use in the subsequently described additive manufacturing processes.

Essentially, ODS alloys are distinguished from conventional superalloys by the dispersion of fine oxide particles and by an elongated grain shape, which develops during a recrystallization heat treatment. This particular grain structure enhances the high temperature deformation behavior by inhibiting intergranular damage accumulation. This is accomplished by increased constraint in the neighborhood of cavitating, transverse grain boundaries, and by increased tortuosity of intergranular crack paths. The movement of dislocations is impeded by the non-shearable dispersoid particles resulting in a threshold stress below which creep rates are negligible.

As initially noted above, oxide dispersion strengthened alloys have been conventionally produced by the mechanical alloying of powders. The powder constituents may be in the elemental, intermetallic, or pre-alloyed state. The metal and oxide (i.e., yttria) powders are blended and mechanically alloyed using a ball mill. The repeated impacts of this process cause smearing together of the powders followed by shearing which generates particles that each contain a fine mixture of the constituents. The powder is then packaged into sealed containers that are hot worked into simple primary shapes, either by extrusion or hot isostatic pressing (HIP). The resultant product is dense and fine grained (less than 1 μm) but has highly developed, directional residual strain. The alloys are then re-crystallised at about 1280-1350° C. when large and highly elongated grains form. Due to the cost and time required for this process, producing alloys by mechanically alloying is often viewed as undesirable.

Mechanical alloying (MA) further disperses a second phase within a matrix material. This prior art dispersion method utilizes solid forms of both materials to avoid ineffective dispersion strengthening by liquid metal dissolutioning of second phase or unfavorable second phase shapes and chemistry by in situ chemical reaction. If the dispersants are sized properly, they strengthen the base material by pinning or redirecting slip lines. Larger dispersants act as defects and will prematurely promote crack initiation and subsequent component distress/failure.

To address the aforementioned need in the art, embodiments of the present disclosure provide an enabling technology that allows oxide dispersion-strengthened alloy components to be formed without the need to use the expensive and time-consuming mechanical alloying procedures previously known in the art. Greater detail regarding the additive manufacturing techniques noted above will now be provided, again with reference to the exemplary gas turbine engine components. It will be appreciated that certain features of the presently described gas turbine engine components would be prohibitively expensive to manufacture using conventional mechanical alloying manufacturing techniques. Using additive manufacturing techniques, however, or other recently developed manufacturing techniques, component parts can be manufactured at a significantly reduced cost as compared to traditional manufacturing techniques. Additive manufacturing techniques include, for example, direct metal laser sintering (DMLS—a form of direct metal laser fusion (DMLF)). DMLS/DMLF is discussed in greater detail below. Another technique includes electron beam melting (EBM).

The present disclosure provides methods for forming the oxide dispersion-strengthened alloys using additive manufacturing processes, for example DMLF. Using this novel DMLF approach, it is now possible to create a manufacturing process that can be used to produce components, such as turbine blades, vanes, nozzles, rings, etc., directly from oxide dispersion-strengthened alloys provided in powder form that, until now, could only be produced using the prior art mechanical alloying approach. DMLF is a manufacturing process that allows for the manufacturing of components layer-by-layer. The DMLF process allows for the elimination of several expensive manufacturing processes associated with producing parts by mechanical alloying (MA) methods. The rapid cooling of the oxide dispersion-strengthened alloy via the DMLF process is a unique process as it provides for an innovative way to produce components with internal passages that are not possible using a forging technology. DMLF technology allows for the manufacturing of components directly from ODS powder material built up by using a scanning laser to melt and solidify very thin (less than 0.025 mm) layers of the powder. The cooling rates achieved by utilizing this technology are as high as about $10^6$ or $10^{7\circ}$ F./second (depending upon build geometry, laser focal parameters, laser power and laser scanning speed) thus producing the desired microstructure directly in the part without the costs and complexities of the MA processing steps. The $10^{7\circ}$ F./sec cooling rate eliminates any potential for dissolutioning of the oxide dispersant and enhances the response for subsequent heat treat formation of conventional second phase precipitation, i.e. gamma prime. As such, the steps of applying the DMLS laser or other focused energy beam (such as an electron beam) to the powdered alloy, withdrawing the DMLS laser, and cooling the melt at about $10^6$ or $10^{7\circ}$ F./second (as a result of the laser being withdrawn) are performed during operation of a DMLS (or other) additive manufacturing process.

Unlike the prior art, this present invention utilizes a low energy density laser beam (DMLF/DMLS), or alternatively an electron beam, to create an ODS alloy via rapid solidification of laser melted ODS alloy powders to achieve the desired material microstructure. The free-form (additive manufacturing) process uses a small, focused beam to build a component by fusing one layer of powder to the layer of powder directly beneath it, thus using the underlying previously solidified layers as a heat sink to achieve high cooling rates in the currently deposited and melted layer. The heat input for the process is controlled with laser focal parameters, laser power, and laser scanning speed. The rapid solidification rate is controlled by the conduction from the currently melted layer to the underlying previously solidified layers. Thus, powder bed temperature, support structures, and DMLS build foundation are all designed and controlled to provide the necessary heat sink parameters to achieve the appropriate ODS microstructure. The DMLS process enables parts to be formed to near-net where appropriate, which eliminates expensive machining costs associated with prior art MA processes. In addition, this innovative process enables cooled, cored passages that are not possible with prior art manufacturing methods.

DMLF is an additive manufacturing process that is used to produce complex geometries in a single operation with no tooling. The mechanical alloying processing/manufacturing route cannot produce detailed features of a geometry referred to as "near-net" as can the DMLF process. The prior art process only allows for the manufacturing of ingots that must then be consolidated, heated, and forged into a shape that is subsequently machined to a print geometry. This processing must be done with great care in order to minimize micro-structural changes and property degradation. DMLF technology allows for the print geometry to be produced "near-net" without the application of the heating and forging processes.

Figure 2:
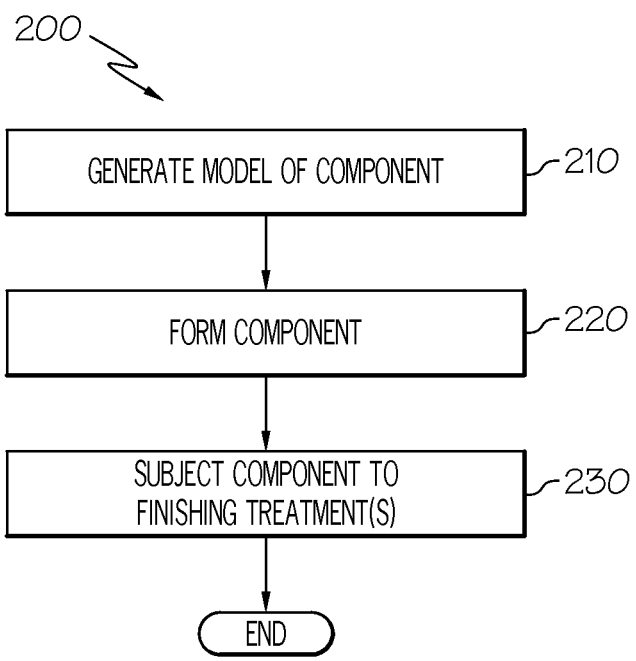
FIG. 2 is a flow diagram illustrating steps in a method of forming an oxide dispersion-strengthened alloy component in accordance with the present disclosure.

FIG. 2 is a flowchart illustrating a method 200 for manufacturing a component, for example an aerospace component, using a oxide dispersion-strengthened alloy in accordance with an exemplary embodiment using, in whole or in part, additive manufacturing techniques based on low energy density energy beams. In a first step 210, a model, such as a design model, of the component may be defined in any suitable manner. For example, the model may be designed with computer aided design (CAD) software and may include three-dimensional ("3D") numeric coordinates of the entire configuration of the component including both external and internal surfaces. In one exemplary embodiment, the model may include a number of successive two-dimensional ("2D") cross-sectional slices that together form the 3D component. Of course, it is not necessary that a "near-net" component be formed using this process. Rather, it may simply be desired to produce a "block" of the oxide dispersion-strengthened alloy using DMLF. Accordingly, the present disclosure should not be considered as limited by any particular component design.

In step 220 of the method 200, the component is formed according to the model of step 210. In one exemplary embodiment, a portion of the component is formed using a rapid prototyping or additive layer manufacturing process. In other embodiments, the entire component is formed using a rapid prototyping or additive layer manufacturing process. Although additive layer manufacturing processes are described in greater detail below, in still other alternative embodiments, portions of the component may be forged or cast in step 220.

Some examples of additive layer manufacturing processes include: selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the component in step 220. DMLF is a commercially available laser-based rapid prototyping and tooling process by which complex parts may be directly produced by precision melting and solidification of metal powder into successive layers of larger structures, each layer corresponding to a cross-sectional layer of the 3D component.

As such, in one exemplary embodiment, step 220 is performed with DMLF techniques to form the component. However, prior to a discussion of the subsequent method steps, reference is made to FIG. 3, which is a schematic view of a DMLF system 300 for manufacturing the component, for example one or more gas turbine engine components, in accordance with an exemplary embodiment.

Figure 3:
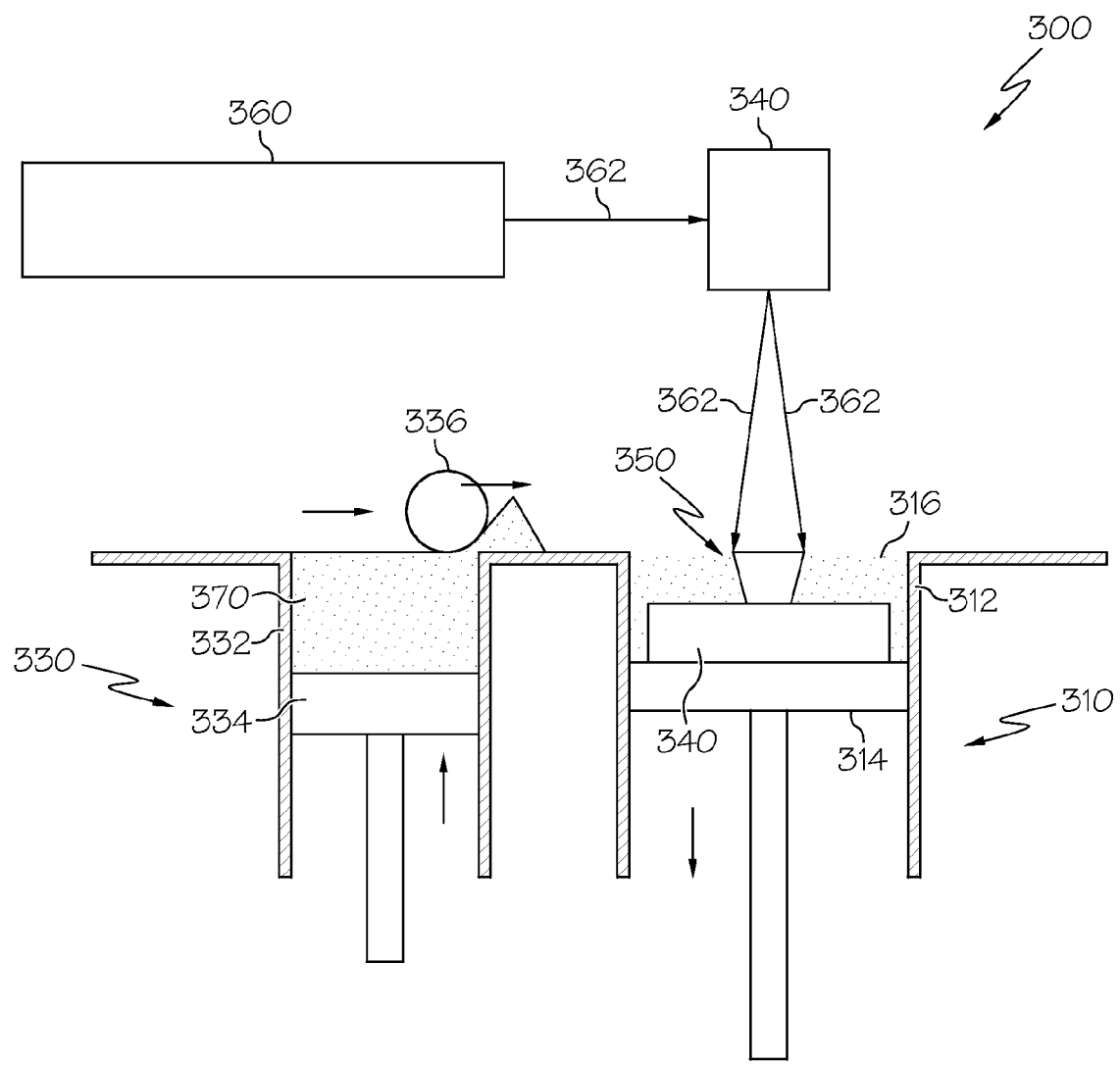
FIG. 3 is an exemplary additive manufacturing system suitable for use in forming an oxide dispersion-strengthened alloy component in accordance with the present disclosure.

Referring to FIG. 3, the system 300 includes a fabrication device 310, a powder delivery device 330, a scanner 340, and a low energy density energy beam generator, such as a laser 360 (or an electron beam generator) that function to manufacture the article 350 (e.g., the component) with build material 370. The fabrication device 310 includes a build container 312 with a fabrication support 314 on which the article 350 is formed and supported. The fabrication support 314 is movable within the build container 312 in a vertical direction and is adjusted in such a way to define a working plane 316. The delivery device 330 includes a powder chamber 332 with a delivery support 334 that supports the build material 370 and is also movable in the vertical direction. The delivery device 330 further includes a roller or wiper 336 that transfers build material 370 from the delivery device 330 to the fabrication device 310.

During operation, a base block 340 may be installed on the fabrication support 314. The fabrication support 314 is lowered and the delivery support 334 is raised. The roller or wiper 336 scrapes or otherwise pushes a portion of the build material 370 from the delivery device 330 to form the working plane 316 in the fabrication device 310. The laser 360 emits a laser beam 362, which is directed by the scanner 340 onto the build material 370 in the working plane 316 to selectively fuse the build material 370 into a cross-sectional layer of the article 350 according to the design. More specifically, the speed, position, and other operating parameters of the laser beam 362 are controlled to selectively fuse the powder of the build material 370 into larger structures by rapidly melting the powder particles that may melt or diffuse into the solid structure below, and subsequently, cool and re-solidify. As such, based on the control of the laser beam 362, each layer of build material 370 may include unfused and fused build material 370 that respectively corresponds to the cross-sectional passages and walls that form the article 350. In general, the laser beam 362 is relatively low power to selectively fuse the individual layer of build material 370. As an example, the laser beam 362 may have a power of approximately 50 to 500 Watts, although any suitable power may be provided.

Upon completion of a respective layer, the fabrication support 314 is lowered and the delivery support 334 is raised. Typically, the fabrication support 314, and thus the article 350, does not move in a horizontal plane during this step. The roller or wiper 336 again pushes a portion of the build material 370 from the delivery device 330 to form an additional layer of build material 370 on the working plane 316 of the fabrication device 310. The laser beam 362 is movably supported relative to the article 350 and is again controlled to selectively form another cross-sectional layer. As such, the article 350 is positioned in a bed of build material 370 as the successive layers are formed such that the unfused and fused material supports subsequent layers. This process is continued according to the modeled design as successive cross-sectional layers are formed into the completed desired portion, e.g., the component of step 220.

The delivery of build material 370 and movement of the article 350 in the vertical direction are relatively constant and only the movement of the laser beam 362 is selectively controlled to provide a simpler and more precise implementation. The localized fusing of the build material 370 enables more precise placement of fused material to reduce or eliminate the occurrence of over-deposition of material and excessive energy or heat, which may otherwise result in cracking or distortion. The unused and unfused build material 370 may be reused, thereby further reducing scrap.

Any suitable laser and laser parameters may be used, including considerations with respect to power, laser beam spot size, and scanning velocity. The build material 370 is provided as an ODS alloy in powdered form with a composition that is capable of achieving a dispersion strengthened microstructure after appropriate processing. For example, the build material is one having a high temperature metal matrix—such as iron aluminide, iron chromium, iron-chromium-aluminium, nickel chromium or nickel aluminide—with small (5-50 nm) oxide particles of, for example, yttria ($Y2O3$) dispersed within it. In general, the powder build material 370 may be selected for enhanced strength, durability, and useful life, particularly at high temperatures, although as described below, the powder build material 370 may also be selected based on the intended function of the area being formed. The powdered form of the alloy is produced by combining the various constituents (metals and other elements) of the alloy into a mixture, melting the mixture, and atomizing the melted mixture to form a powder, a process which is well-known in the art.

Returning to FIG. 2, at the completion of step 220, the article, i.e., the component, may be given a stress relief treatment and then is removed from the additive manufacturing system (e.g., from the DMLF system 300). In optional step 230, the component formed in step 220 may undergo finishing treatments. Finishing treatments may include, for example, polishing and/or the application of coatings. If necessary, the component may be machined to final specifications. For example, in some embodiments in accordance with the present disclosure, aerospace components can be manufactured by the DMLF process (optionally including machining) described herein.

Accordingly, the exemplary embodiments described herein provide improved methods for forming oxide dispersion-strengthened alloy components. Using the additive manufacturing processes described herein, such as the DMLF process, the desired alloy microstructure and properties can be generated directly in a component, without the need for the multiple steps required to mechanically alloy (MA) useful components. The described embodiments allow for the elimination of the consolidation, extrusion, and forging steps minimizes their potentially damaging effects on microstructure and properties, thus producing parts with properties equal to or exceeding those of components produced via the conventional powder processing MA route. The DMLF process does not need expensive and unique extrusion and forging tooling and equipment associated with the prior art manufacturing methods. As, such, utilizing DMLS processing is an innovative, low cost enabler to produce oxide dispersion strengthened (ODS) alloys, which cannot be economically produced with prior art elevated temperature/rolling processes for the production of MA alloys with the proper microstructure. Using the DMLS process, the desired ODS alloy microstructure and properties can be fabricated directly into a near-net component, such as a turbine blade, vane, ring, nozzle, etc., without the need for prior art elevated temperature/rolling processes.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A method of forming an oxide dispersion-strengthened alloy metal comprising the steps of:
    providing, in a powdered form, an oxide dispersion-strengthened alloy composition that is capable of achieving a dispersion-strengthened microstructure, wherein providing the oxide dispersion-strengthened alloy composition in powdered form comprises mixing a plurality of metals and oxides forming the alloy to form a mixture, melting the mixture to form a melted mixture, and atomizing the melted mixture into the powdered form;
    directing a low energy density energy beam at a portion of the alloy composition, wherein the portion of the alloy composition is provided in a layer having a thickness of less than 0.025 mm;
    withdrawing the energy beam from the portion of the powdered alloy composition; and cooling the portion of the powdered alloy composition at a rate greater than or equal to $10^{7 \circ}$ F. per second, thereby forming the oxide dispersion-strengthened alloy metal.

2. The method of claim 1, wherein providing the oxide dispersion-strengthened alloy composition comprises providing a nickel chromium powder composition.

3. The method of claim 1, wherein providing the oxide dispersion-strengthened alloy composition comprises providing a nickel aluminide powder composition.

4. The method of claim 1, wherein providing the oxide dispersion-strengthened alloy composition comprises providing an iron aluminide or an iron-chromium-aluminium powder composition.

5. The method of claim 1, wherein directing a low energy density energy beam at a portion of the powdered alloy composition comprises subjecting the powdered alloy composition to an additive manufacturing procedure that employs a low energy density laser beam.

6. The method of claim 5, wherein subjecting the powdered alloy composition to the additive manufacturing procedure comprises subjecting the powdered alloy composition to a direct metal laser sintering procedure.

7. The method of claim 1, wherein cooling the portion of the powdered alloy composition occurs immediately upon withdrawal of the energy beam.

8. The method of claim 7, wherein cooling the portion of the powdered alloy composition occurs as a result of the withdrawal of the energy beam.

9. The method of claim 1, further comprising directing the low energy density energy beam at a further portion of the alloy composition.

10. The method of claim 9, further comprising withdrawing the energy beam from the further portion of the powdered alloy composition.

11. The method of claim 10, further comprising cooling the further portion of the powdered alloy composition at a rate greater than or equal to $10^{7 \circ}$ F. per second, thereby forming additional oxide dispersion-strengthened alloy metal.

12. The method of claim 11, wherein the steps of directing the low energy density energy beam, withdrawing the energy beam, and cooling the portion of the powdered alloy composition are performed as a result of an additive manufacturing process applied to the powdered alloy composition.

13. The method of claim 12, wherein the additive manufacturing process is direct metal laser sintering.

14. The method of claim 1, wherein forming the oxide-dispersion strengthened alloy metal comprises forming a turbine engine component.

15. The method of claim 14, wherein forming the turbine engine component comprises forming a turbine blade, a turbine vane, or a turbine nozzle.

16. The method of claim 1, wherein providing the oxide-dispersion strengthened alloy in powdered form comprises providing a powder dispersion created by hydrometallurgical processing.

17. The method of claim 1, wherein providing the oxide-dispersion strengthened alloy comprises providing an alloy having oxide dispersoids therein selected from the group consisting of: yttria, hafnia, silica, zirconia, and magnesia.

18. The method of claim 1, wherein providing the oxide-dispersion strengthened alloy comprises providing a nickel or nickel chromium alloy having thorium oxide ($ThO_2$) dispersoids therein.

* * * * *